July 8, 1952  J. K. BRUCE  2,602,533
MATERIALS HANDLING APPARATUS
Filed March 2, 1951  2 SHEETS—SHEET 1

INVENTOR:
JOHN K. BRUCE
BY *James B. Christie*
ATTORNEY

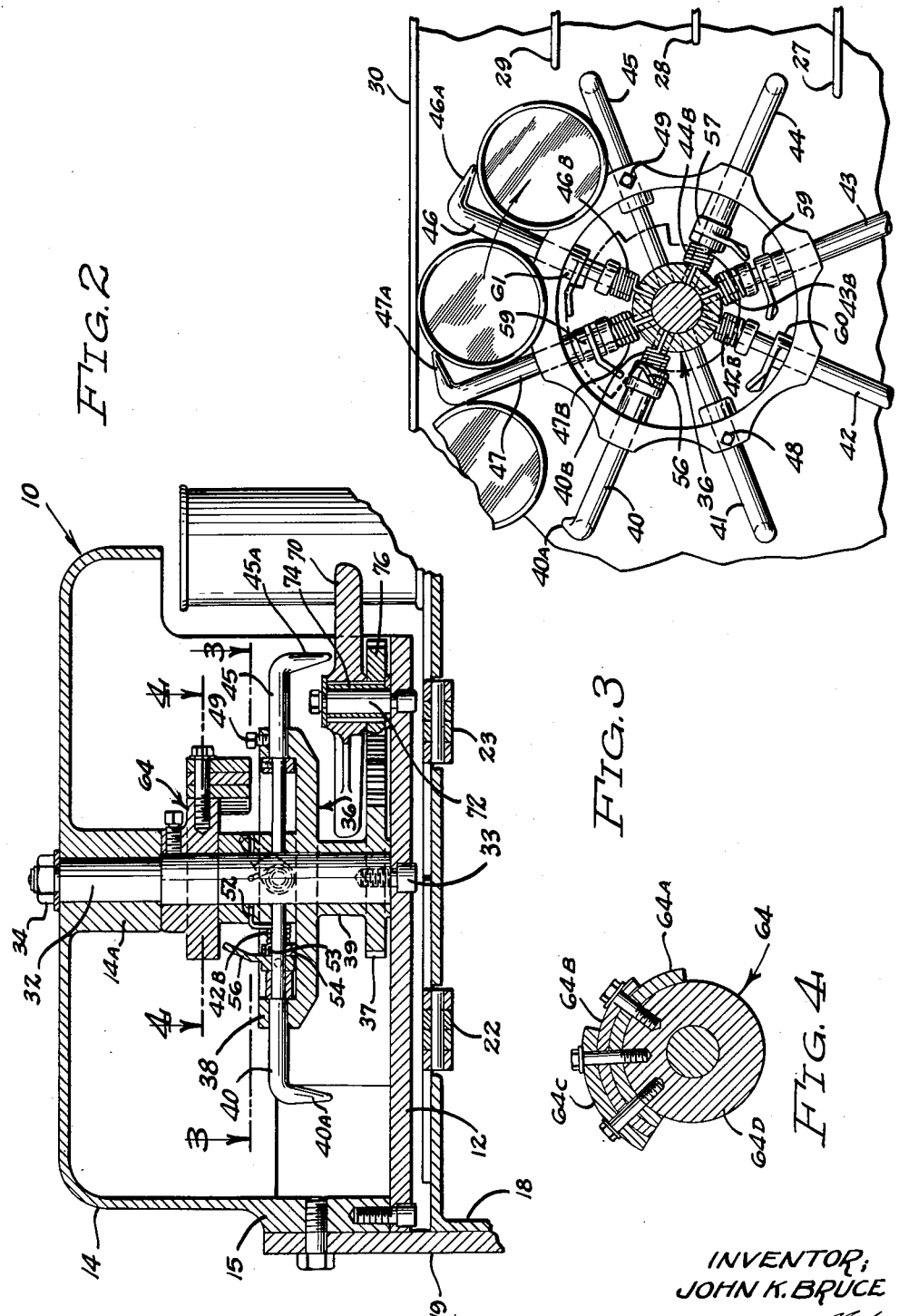

Patented July 8, 1952

2,602,533

UNITED STATES PATENT OFFICE 2,602,533

MATERIALS HANDLING APPARATUS

John K. Bruce, South Pasadena, Calif., assignor to Bruce Engineering Corporation, San Francisco, Calif., a corporation of California Application March 2, 1951, Serial No. 213,519

18 Claims. (Cl. 198—31)

This invention is in the field of materials handling and relates specifically to an apparatus for channeling objects such as cans, bottles, etc. on separate predetermined sections of a conveyor system.

The apparatus of the invention is referred to throughout the specification as a "diverger" since it operates on the principle of diverging a line of objects into two or more lines, each including the same number of objects or a predetermined proportion of the total number of units. The diverger, by suitable size adjustment, is applicable to the handling of substantially any type of object which may conveniently be fed to the apparatus on conveying means. For convenience in description and for the reason that the diverger was particularly designed for the packaging industry, the term "container" is used throughout the specification and claims to include not only cans and bottles and the like but also other objects adapted to assembly line techniques.

There are many circumstances in container handling practice where it becomes desirable to channel containers traveling in single file on a single conveyor onto two or more conveyors or conveyor sections. The terminology "conveyor sections" is employed herein to designate either a plurality of separate conveyors or a single conveyor divided into a plurality of longitudinal sections by means of baffles. One instance of the desirability of achieving such container divergence, and by way of example, is in the caser apparatus described and claimed in co-pending United States patent application, Serial No. 210,552, filed February 12, 1951, by John K. Bruce and George L. Frank. In the apparatus described in this co-pending application, container units, fed to the apparatus in a single file, are in a first stage of the operation alternately and sequentially channeled or diverted into the two or more parallel juxtaposed conveyors or divided sections of a single conveyor. The present invention contemplates simple and reliable apparatus for carrying out such diversion and at a high throughput rate, and generally comprises a housing adapted to be mounted above an end of such a sectioned conveyor, a hub member mounted in the housing to rotate on an axis perpendicular to the surface of the conveyor, a plurality of guide fingers rotatably mounted in the hub to project approximately radially therefrom, each finger having a container engaging projection at its outer end, spring loading means connected between the hub and each finger loading each finger against rotation about its longitudinal axis, and means for causing intermittent rotation of at least one of said fingers through a 90° arc.

In one embodiment the several fingers are spring loaded in a position with the end projections extending parallel to the axis of rotation of the hub, i. e. perpendicular to the surface of the conveyor, and means are provided causing intermittent rotation of certain of these fingers to position the end projections thereof in a plane parallel to the surface of the conveyor. The several fingers are angularly spaced from each other to accommodate a single container between adjoining fingers, the containers being carried from a point of entry to a point of exit by rotation of the hub and consequent rotation of the fingers about an axis perpendicular to the surface of the conveyor, the point of exit for each container being determined by the positioning of the end projection of the respective finger. With a given finger oriented with its end projection extending parallel to the axis of hub rotation, a container carried by that finger will pass out of the influence of the finger at the earliest opportunity. With a different finger oriented with its end projection lying parallel to the surface of the conveyor, a container carried by that finger will remain engaged by the finger and will be carried around the arc of rotation of the finger until the same is rotated to a position with the end container engaging projection extending perpendicularly with respect to the surface of the conveyor.

In a preferred embodiment a star wheel is included in the apparatus and is rotatably mounted in the housing adjacent the point of entry of the container line. Each container urged into the housing from the feed conveyor engages one arm of the start wheel which serves the double purpose of spacing the containers so that each container will be picked up by a separate one of the guide fingers and the further purpose of driving the mechanism. The star wheel in this preferred embodiment is geared to the aforementioned hub through a reversing gear, the apparatus being driven in this fashion solely by the momentum of the containers fed to it.

The diverger of the invention will be more clearly understood from the following detailed description taken in conjunction with the accompanying drawing in which:

Fig. 2 is a vertical section taken on the line 2—2 of Fig. 1;

Fig. 3 is a horizontal section taken on the line 3—3 of Fig. 2; and

Fig. 4 is a horizontal section taken on the line 4—4 of Fig. 2.

Figure 1:
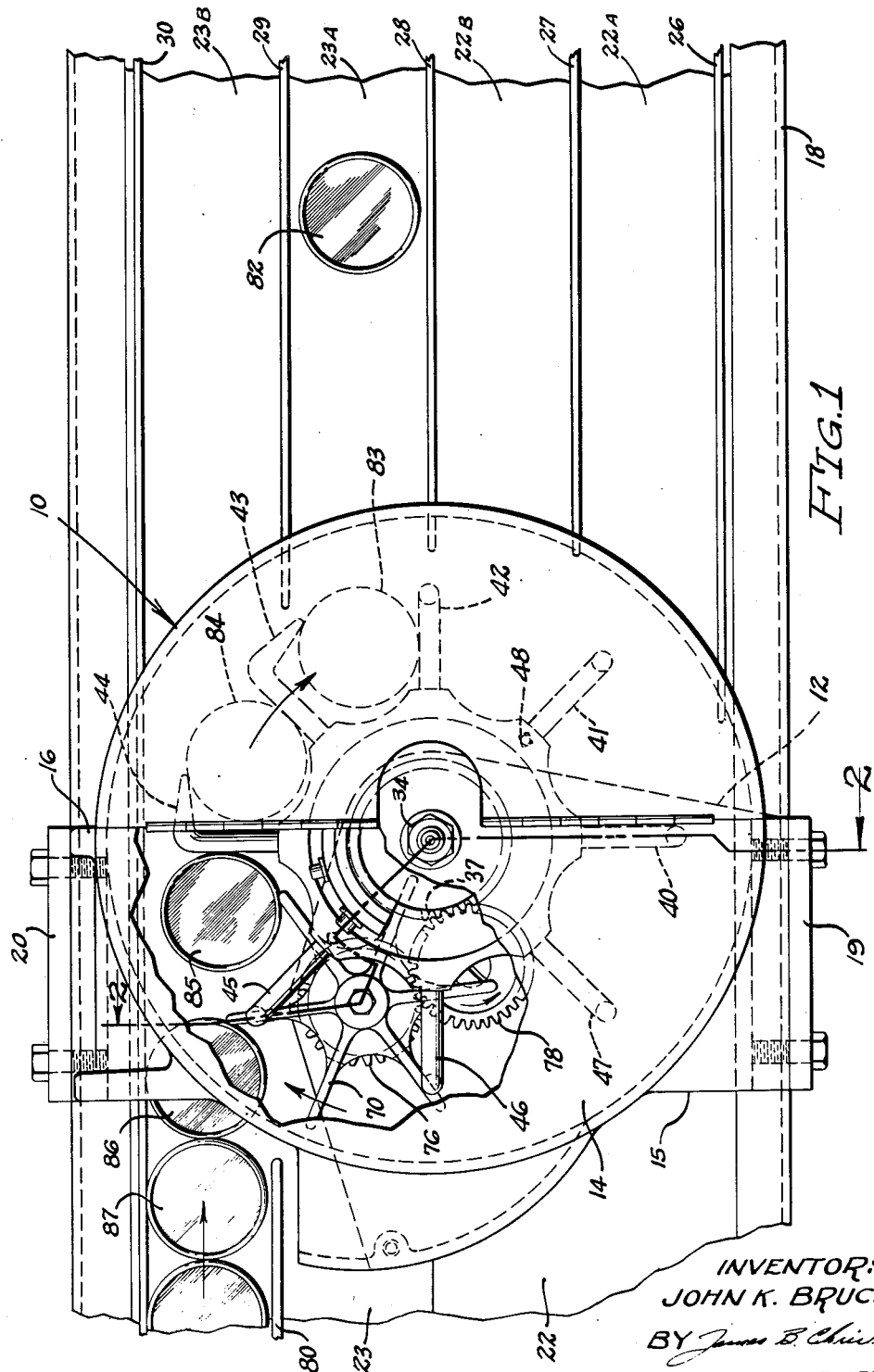
Fig. 1 is a plan view of a preferred embodiment of the invention partially cut away to show details thereof.

Referring to all of the figures of the drawing, the illustrated diverger comprises a generally cylindrical housing 10 formed by a base plate 12 and a cylindrical cover 14. The diverger is adapted to be mounted above a conveyor system and to be supported by the conveyor system support structure. For this purpose the cover 14 is provided with projecting flanges 15, 16 by means of which the diverger is mounted to the illustrated conveyor support structure 18 by means of mounting brackets 19, 20 projecting upwardly from opposite sides of the conveyor support structure. Other mounting means may be used with equal facility, as for example overhead suspension means.

In the particular embodiment shown, a pair of table top type conveyors 22, 23 are illustrated as traveling on the support structure 18, each of the two conveyors being divided into two longitudinal contiguous sections 22A, 22B, and 23A, 23B, respectively, by a series of parallel evenly spaced baffles 26, 27, 28, 29, 30 extending along the conveyor from the housing 10. The conveyor system thus provides four separate conveyor sections on the downstream side of the diverger. The two conveyor sections 22, 23 pass beneath the housing 10 as a single conveyor of a width approximating that of the housing and are sectionalized as described downstream from the housing for the reasons hereinafter made apparent. The illustrated conveyor system is only one of a number of possible systems which may be employed, it being obvious that a single conveyor may be similarly divided into four sections or one or more conveyors may be divided into a larger or smaller number of sections as dictated by the use to which the apparatus is to be put.

The side wall of the cover member 14 is cut away throughout a large part of the periphery of the cover, the cut away portion conforming generally to the region excluded by the base plate 12 (see Fig. 1) to allow entry and exit of containers into and out of the housing.

A post 32 is centrally and vertically mounted in the housing 10, being affixed to the base plate 12 by a bolt 33 and to the cover member 14 by a nut 34. As shown in Fig. 1 the cover 14 preferably includes an inwardly projecting boss 14A through which the post 32 projects, the function of the boss being to strengthen the apparatus.

A hub member 36 is rotatably mounted on the post 32 above the base 12 and includes a spur gear 37 and an annular flange 38, both being supported from or formed integrally with a sleeve 39 rotatable about the post 32. A plurality of fingers 40, 41, 42, 43, 44, 45, 46, 47 are mounted radially to the hub 36, each finger being journalled at its inner end in the hub sleeve and intermediate its ends through the annular flange 38 for rotation about its longitudinal axis. The guide fingers 40, 41, etc. are thus rotatable with the hub to sweep above the conveyor surface and are independently rotatable about their longitudinal axes which lie in a plane parallel to and above the conveyor surface. Diametrically opposite fingers 41, 45 (see Fig. 3) are fixed against rotation about this axis by set screws 48, 49, respectively, in the annular flange 38 and for reasons hereinafter made apparent. The outer ends of each of the fingers has a right angle container engaging projecting tip 40A, 45A, etc. and each of the fingers, with the exception of fingers 41 and 45, is spring loaded by helical springs 40B, 42B, 43B, 44B, 46B, 47B, respectively, against rotary motion and in the equilibrium position with the respective projecting tips 40A, 42A, etc. projecting toward the conveyor surface and generally parallel to the axis of rotation of the hub. Each of the several loading springs is anchored at one end to the hub and at the other end to a sleeve affixed to the respective finger. The spring 42B (see Fig. 2) has an end 52 anchored in the hub 36 and an end 53 anchored in the sleeve 54 affixed to the finger 40. The springs associated with each of the other fingers are similarly mounted.

Each of the several fingers, again with the exception of fingers 41 and 45, are provided with a cam follower anchored to the respective finger and with the cam followers being spaced different radial distances from the axis of rotation of the hub. The cam followers of diametrically opposite ones of the guide fingers are spaced equally from the radius of rotation. In Figs. 2 and 3 diametrical opposing fingers 40 and 44 are provided respectively with cam followers 56, 57 of equal radial displacement. Diametrically opposing fingers 43 and 47 are provided with cam followers 58, 59 of equal radial displacement somewhat greater than the radial displacement of the followers 56, 57. Diametrically opposing fingers 42, 46 are provided respectively with cam followers 60, 61, again equally radially spaced and on a larger radius than the followers on the other fingers.

A cylindrical cam 64 is stationarily mounted on the post 32 above the hub 36 and includes three parallel radially spaced arcuate cam segments 64A, 64B, 64C mounted to a hub 64D. The three cam segments are radially spaced from the axis of rotation of the hub 36 so that each of the three is engaged by a different pair of cam followers on the several fingers. As the hub 36 rotates, the cam followers on fingers 40, 44 will engage the cam segment 64A, the cam followers on the fingers 43, 47 will engage the cam segment 64B and the cam followers on fingers 42, 46 will engage the cam segment 64C, engagement of the cam followers with the cam segments in each case causing the respective fingers to rotate through a 90° arc against the spring loading and about their own longitudinal axes so that the respective end projections on the fingers are displaced to lie in a horizontal plane. The projections 46A, 47A at the ends of fingers 46, 47, respectively, are shown in this position in Fig. 3.

A star wheel 70 is rotatably mounted on a post 72 projecting from the housing base 12 parallel to the post 32. The post 72 is fixed against rotational movement and the star wheel 70 is rotatably mounted to the post through a cylindrical sleeve bushing 74. As shown in Fig. 1 the star wheel 70 is positioned adjacent the incoming line of containers, each succeeding container engaging a succeeding finger of the star wheel and causing the star wheel to rotate through an angle sufficient to pass the container into the path of the guide fingers 40, 41, etc. The star wheel 70 carries a spur gear 76. A reversing gear 78 is mounted to mesh with the spur gear 76 and with the spur gear 37 of the hub 36 so that rotation of the star wheel 70 by the incoming containers causes rotation of the hub 36 in the same direction.

The operation of the apparatus is as follows. A series of containers are fed into the open inlet end of the housing 10 as on a portion of the conveyor 23, as shown in Fig. 1. The conveyor is conveniently divided on the inlet side by a single baffle 80 to keep the incoming containers in single file alignment. A series of containers are shown in the apparatus in the illustration of Fig. 1 and are designated as 82, 83, 84, 85, 86 and the next succeeding incoming container is designated 87. As the container 86 strikes one of the arms of the star wheel 70 it causes rotation of the star wheel under the urging of succeeding containers stacked up on the moving conveyor 23. The motivation of the diverging apparatus is derived from power transmitted from the conveyor to the incoming container line through frictional contact. The inertia of the system is preferably established at such a value that at least two abutting incoming containers are required to bring about its operation. This insures that each guide finger will carry a container so that resultant distribution will be uniform.

The container 86 will, by rotation of the star wheel 70 and consequent rotation of the hub, pass into the position occupied by container 85 in the drawing. The hub 36 carrying the several guide fingers 40, 41, etc., is in substantially continuous rotation about its vertical axis as a result of a continuous flow of containers past the star wheel 70. As each succeeding one of the fingers 40, 41, etc. approaches the point of container inlet it picks up a separate container carrying it clockwise, as viewed in Fig. 1, and ejecting it into appropriate ones of conveyor sections 22A, 22B, 23A, 23B. Containers picked up by the fingers 41, 45 will pass directly onto the conveyor section 23B since each of these fingers is held against rotary motion and the container engaging tips thereof do not rotate into a container-holding position. Containers picked up by guide fingers 42, 46, which follow fingers 41, 45 respectively, will be discharged onto conveyor section 23A immediately adjacent the conveyor section 23B since the container retaining tips of these fingers are held in a horizontal container-holding position by cam segment 64C through an arc sufficient to carry the container only past the first conveyor section 23B. As soon as the respective finger passes the clockwise end (see Fig. 4) of the cam segment 64C the spring, loading that finger, will cause the end projection to rotate to a vertical position and the container held by that finger will immediately pass outwardly on the conveyor and onto the section 23A thereof. Fingers 43 and 47 remain in the container engaging position through a larger arc as defined by the cam segment 64B and release the containers, only after passing the baffle 28, into section 22B of the conveyor, and fingers 40 and 44 engage the containers through an arc defined by the cam segment 64A which carries these containers to the last section 22A of the conveyor. In Fig. 1 the container 85 will be picked up by finger 45 and will be deposited in conveyor section 23B since the finger 45 does not rotate to a gripping position. Container 84 is retained by finger 44 which is held in a gripping position by the cam segment 64C until the container is deposited into conveyor section 22A. Container 83 is retained by finger 43 until it reaches the conveyor section 22B and container 82 is retained by finger 42 until the container is discharged into conveyor section 23A. The guide finger hub rotates continuously at a speed determined by the speed in which the containers are fed into the housing. The inertia of the star wheel and hub is such that the machine will not operate on a single container requiring at least a second container 87 to force the container 86 past the star wheel. The containers are alternately discharged on the four conveyor sections in the manner described, two containers being discharged in each section in a complete revolution of the control wheel.

A feature of the invention is the flexibility of the apparatus. It is obvious that the number of guide fingers and the number of conveyor sections upon which containers may be directed, is determined only by the size of the containers and the size of the apparatus. A larger guide finger wheel having a larger number of container engaging fingers could be adapted to containers of larger size or to containers of the same size as illustrated. The guide finger wheel, as shown, can be arranged simply by changing the number and orientation of the cam segments 64A, 64B, 64C to discharge containers in any sequence on any one of two or more conveyor sections. Thus it is a relatively simple matter to divert three containers onto the conveyor section 23A for each container passed onto section 23B simply by making all three of the cam segments identical with the segment 64C. Many other combinations and container diverging patterns are obvious.

The apparatus is illustrated as operating in conjunction with a table top conveyor. It is also usable with belt conveyors and in the same manner. If used in conjunction with a belt conveyor or other type conveyor exhibiting a high coefficient of friction with the containers supported thereon, an additional support means may be rotatably mounted above the guide fingers to engage succeeding containers and to prevent them from "cocking" under the influence of conveyor drag. Many different means may be employed to accomplish such anti-cocking function in those installations in which the problem is present.

Although the invention has been described with its principal use in mind, namely channeling containers onto two or more conveyors, it is equally adapted to variations of such use. If, for example, a plurality of objects are to be separated so that every fourth, tenth or other incremental item is to be withdrawn for inspection, such withdrawal can be automatically carried out with the present diverger. In short, the utility of the diverger is not limited to deposition of containers on conveyor sections, although, in present contemplation, is its principal use.

I claim:

1. A diverger for channeling containers onto a plurality of conveyor sections comprising a plurality of radially disposed guide fingers mounted to rotate about an axis perpendicular to the surface of said conveyor sections, at least one of said fingers including holding means at its outer end for engaging a container and being rotatable about its longitudinal axis, and means operable to rotate at least said one of said fingers about its longitudinal axis to carry said holding means from a non-engaging to a container engaging position.

2. A diverger for channeling containers onto a plurality of conveyor sections comprising a plurality of radially disposed guide fingers mounted to rotate about an axis perpendicular to the surface of said conveyor sections, at least one of said fingers including holding means at its outer end for engaging a container and being rotatable about its longitudinal axis, and means operable responsive to rotation of said fingers about said perpendicular axis to rotate at least said one of said fingers about its longitudinal axis to carry said holding means from a container engaging position to a non-engaging position.

3. A diverger for channeling containers onto a plurality of conveyor sections comprising a plurality of radially disposed guide fingers mounted to rotate about an axis perpendicular to the surface of said conveyor sections, a number of said fingers at least equal to one less than the number of said conveyor sections including holding means at their outer ends for engaging a container and being rotatable about their respective longitudinal axes, and means operable responsive to rotation of said fingers about said perpendicular axis to rotate said number of said fingers about their respective longitudinal axes to carry said holding means from a container engaging position to a non-engaging position.

4. A diverger for channeling containers onto a plurality of conveyor sections comprising a plurality of radially disposed guide fingers mounted to rotate about an axis perpendicular to the surface of said conveyor sections, at least one of said fingers including holding means at its outer end for engaging a container and being rotatable about its longitudinal axis, and means operable responsive to rotation of said fingers about said perpendicular axis to rotate at least said one of said fingers about its longitudinal axis to carry said holding means from a non-engaging to a container engaging position.

5. A diverger for channeling containers onto a plurality of conveyor sections comprising a plurality of radially disposed guide fingers mounted to rotate about an axis perpendicular to the surface of said conveyor sections, at least one of said fingers including holding means at its outer end for engaging a container and being rotatable about its longitudinal axis, and means operable responsive to rotation of said fingers about said perpendicular axis to rotate at least said one of said fingers about its longitudinal axis to carry said holding means from a non-engaging to a container engaging position and for maintaining said finger in said container engaging position for a part only of its circular path.

6. A diverger for channeling containers onto a plurality of conveyor sections comprising at least one set of radially disposed guide fingers mounted to rotate about an axis perpendicular to the surface of said conveyor sections, each set of guide fingers including a number of fingers equal to the number of conveyor sections, at least all but one of the fingers of each set including holding means at their outer ends for engaging a container, and means operable responsive to rotation of said fingers about said perpendicular axis to rotate said fingers having holding means about their respective longitudinal axes to carry respective ones of said holding means from a non-engaging to a container engaging position and for maintaining said last mentioned fingers in container engaging position for a part only of their common circular paths.

7. Apparatus according to claim 6 wherein said means operable responsive to rotation of said fingers about said perpendicular axis to rotate said fingers about their longitudinal axes comprises separate means associated with each finger for separately rotating each finger to a container engaging position and for maintaining each finger in such position for a different part of their common circular paths.

8. A diverger for channeling container units onto a plurality of conveyor sections comprising a housing adapted to be mounted above the conveyor, a hub member mounted in the housing to rotate on an axis perpendicular to the surface of the conveyor, a plurality of guide fingers rotatably mounted in the hub to project approximately radially therefrom, at least one of said fingers having a right angle projection at its outer end and being rotatable about its longitudinal axis, and means causing intermittent rotation of said one of said fingers to place and hold the end projection of such finger parallel to the conveyor surface throughout a part of the circular sweep of the finger.

9. A diverger for channeling container units onto a plurality of conveyor sections comprising a housing adapted to be mounted above the conveyor, a hub member mounted in the housing to rotate on an axis perpendicular to the surface of the conveyor, a plurality of guide fingers mounted in the hub to project approximately radially therefrom, at least one of said fingers having a container engaging projection at its outer end and being rotatable about its longitudinal axis, spring loading means connected between the hub and said one of said fingers loading the finger against rotation and with said projection extending parallel to the axis of rotation of the hub, and means causing intermittent rotation of said one of said fingers through a 90° arc to place the end projection of such finger parallel to the conveyor surface.

10. A diverger for channeling container units onto a plurality of conveyor sections comprising a housing adapted to be mounted above the conveyor, a hub member mounted in the housing to rotate on an axis perpendicular to the surface of the conveyor, a plurality of guide fingers rotatably mounted in the hub to project approximately radially therefrom, a number of said fingers at least equal to one less than the number of said conveyor sections having right angle projections at their outer ends, spring loading means connected between the hub and the said number of said fingers loading the fingers against rotation and with said projections extending parallel to the axis of rotation of the hub, and means causing intermittent rotation of said number of said fingers through a 90° arc to place the end projections of such fingers parallel to the conveyor surface.

11. A diverger for channeling container units onto a plurality of conveyor sections comprising a housing adapted to be mounted above the conveyor, a hub member mounted in the housing to rotate on an axis perpendicular to the surface of the conveyor, a plurality of guide fingers rotatably mounted in the hub to project approximately radially therefrom, a number of said fingers at least equal to one less than the number of conveyor sections having right angle projections at their outer ends, spring loading means connected between the hub and said number of said fingers loading the fingers against rotation and with said projections extending parallel to the axis of rotation of the hub, and means causing intermittent rotation of said number of said fingers through a 90° arc to place the end projections of such fingers parallel to the conveyor surface and to hold the end projections of the several fingers in said parallel position through different arcs of rotation about said perpendicular axis.

12. A diverger for channeling containers received in single file onto a plurality of conveyor sections comprising a housing adapted to be mounted above a conveyor, a hub member mounted in the housing to rotate on an axis perpendicular to the surface of said conveyor sections and including an annular flange, a plurality of guide fingers mounted radially to said hub member, at least one of said fingers being journalled at its inner end in said hub and intermediate its ends through said annular flange and rotatable about its longitudinal axis, a tip at the end of each rotatable finger projecting approximately at right angles to the longitudinal axis of the finger, means spring loading at least one of the rotatable fingers against rotation about its longitudinal axis and with its tip projecting toward the conveyor surface and parallel to the axis of rotation of said hub, a cam follower mounted on each of said rotatable fingers, a cylindrical cam mounted above said hub and having a radius corresponding to the radial displacement of said cam follower and projecting into the path of said cam follower whereby, as said hub rotates, engagement of said cam follower and cam causes the respective finger to rotate about its longitudinal axis so that its tip will extend parallel to the conveyor surface and in the direction of hub rotation and remain in said position until the cam follower passes the cam.

13. A diverger for channeling containers received in single file onto a plurality of conveyor sections comprising a housing adapted to be mounted above a conveyor, a hub member including a spur gear and an annular flange connected by a cylindrical sleeve mounted in the housing to rotate on an axis perpendicular to the surface of said conveyor sections, a plurality of guide fingers mounted radially to said hub member, at least one of said fingers being journalled at its inner end in said sleeve and intermediate its ends through said annular flange and rotatable about its longitudinal axis, a tip at the outer end of said one of said fingers projecting approximately at right angles to the longitudinal axis of the finger, means spring loading said one of said fingers against rotation about its longitudinal axis and with its tip projecting toward the conveyor surface and parallel to the axis of rotation of said hub, a cam follower mounted on said one of said fingers between the said sleeve and annular flange, a cylindrical cam mounted above said hub and having a radius corresponding to the radial displacement of said cam follower and projecting into the path of said cam follower whereby, as said hub rotates, engagement of said cam follower and cam causes the respective finger to rotate about its longitudinal axis so that its tip will extend parallel to the conveyor surface and in the direction of hub rotation, a star wheel rotatably mounted so that incoming containers engage succeeding arms thereof and are positioned in the path of said fingers, and gear means connecting said star wheel and said spur gear so that rotation of the star wheel causes rotation of said hub and in the same direction.

14. A diverger for channeling containers received in single file onto a plurality of conveyor sections comprising a housing adapted to be mounted above a conveyor, a hub member including a spur gear and an annular flange connected by a cylindrical sleeve mounted in the housing to rotate on an axis perpendicular to the surface of said conveyor sections, a plurality of guide fingers mounted radially to said hub member, each finger being journalled at its inner end in said sleeve and intermediate its ends through said annular flange, a tip at the end of each finger projecting approximately at right angles to the longitudinal axis of the finger, means spring loading at least one of the fingers against rotation about its longitudinal axis and with its tip projecting toward the conveyor surface and parallel to the axis of rotation of said hub, a cam follower mounted on each of the spring loaded fingers between the said sleeve and annular flange, a cylindrical cam mounted above said hub and having a radius corresponding to the radial displacement of the cam followers and projecting into the path of said cam followers whereby, as said hub rotates, engagement of said cam followers and cam causes the respective fingers to rotate about their longitudinal axes so that their tips will extend parallel to the conveyor surface and in the direction of hub rotation, a star wheel rotatably mounted so that incoming containers engage succeeding arms thereof and are positioned in the path of said fingers, and gear means connecting said star wheel and said spur gear so that rotation of the star wheel causes rotation of said hub and in the same direction.

15. Apparatus according to claim 14 wherein said cam followers on different ones of said spring loaded fingers are at different radial distances from the axis of hub rotation, and said cylindrical cam comprises a number of coaxial segments lying on radii corresponding to the radii of said cam followers.

16. Apparatus according to claim 14 wherein said cam followers on different ones of said spring loaded fingers lie on different radii of the circular path swept by the fingers, and said cylindrical cam comprises a number of concentric segments lying on radii corresponding to the radii of said cam followers and subtending different arcs.

17. A diverger for separating a plurality of objects into groups in accordance with a predetermined pattern comprising a plurality of radially disposed guide fingers mounted to rotate simultaneously about a common axis perpendicular to the longitudinal axes of the several fingers, at least one of said fingers including holding means at its outer end for engaging an object and being rotatable about its longitudinal axis, and means operable to rotate at least said one of said fingers about its longitudinal axis to carry said holding means from a non-engaging to an object engaging position.

18. A diverger for separating a plurality of objects into groups in accordance with a predetermined pattern comprising a plurality of radially disposed guide fingers mounted to rotate simultaneously about a common axis perpendicular to the longitudinal axis of the several fingers, at least one of said fingers including holding means at its outer end for engaging an object and being rotatable about its longitudinal axis, and means operable responsive to rotation of said fingers about said perpendicular axis to rotate at least said one of said fingers about its longitudinal axis to carry said holding means from a non-engaging to an object engaging position.

JOHN K. BRUCE.

No references cited.